US006635846B1

(12) United States Patent
Rieck

(10) Patent No.: US 6,635,846 B1
(45) Date of Patent: Oct. 21, 2003

(54) SELECTIVE LASER COMPOUNDING FOR VITRESCENT MARKINGS

(76) Inventor: Albert S. Rieck, 6985 Garden Rd., Riviera Beach, FL (US) 33404

( * ) Notice: Subject to any disclaimer, the term of this patent is extended or adjusted under 35 U.S.C. 154(b) by 0 days.

(21) Appl. No.: 10/211,956

(22) Filed: Aug. 2, 2002

(51) Int. Cl.[7] .................................... B23K 26/00
(52) U.S. Cl. .................................... 219/121.69
(58) Field of Search .................... 219/121.6, 121.68, 219/121.69, 121.85

(56) References Cited

U.S. PATENT DOCUMENTS

| | | | |
|---|---|---|---|
| 3,747,117 A | | 7/1973 | Fechter |
| 4,769,310 A | | 9/1988 | Gugger et al. |
| 4,814,575 A | | 3/1989 | Petitbon |
| 5,030,551 A | | 7/1991 | Herren et al. |
| 5,103,073 A | | 4/1992 | Danilov et al. |
| 5,198,637 A | | 3/1993 | Noda et al. |
| 5,215,864 A | | 6/1993 | Laakmann |
| 5,309,273 A | | 5/1994 | Mori et al. |
| 5,331,443 A | | 7/1994 | Stanisci |
| 5,346,802 A | | 9/1994 | Ohbachi et al. |
| 5,427,825 A | | 6/1995 | Murnick |
| 5,480,308 A | | 1/1996 | Boundy et al. |
| 5,538,764 A | | 7/1996 | Li et al. |
| 5,554,335 A | | 9/1996 | Fields et al. |
| 5,673,532 A | | 10/1997 | Jennings et al. |
| 5,801,356 A | | 9/1998 | Richman |
| 5,816,572 A | * | 10/1998 | Chalfin |
| 5,985,078 A | * | 11/1999 | Suess et al. |
| 6,064,034 A | | 5/2000 | Rieck |
| 6,075,223 A | | 6/2000 | Harrison |
| 6,238,847 B1 | | 5/2001 | Axtell, III et al. |
| 6,372,819 B1 | | 4/2002 | Mizobuchi et al. |

FOREIGN PATENT DOCUMENTS

| | | |
|---|---|---|
| WO | WO 95/35269 | 12/1995 |

* cited by examiner

*Primary Examiner*—Samuel M. Heinrich
(74) *Attorney, Agent, or Firm*—McHale & Slavin, P.A.

(57) ABSTRACT

A laser such as a continuous wave Nd:Yag or carbon dioxide unit is configured for optimized virescence of a colorant carrier and an object placed in the path of the beam. The beam is steered via computer controlled motors attached to reflecting mirrors located in the path of the beam. Graphical characters and letters can be vitrified into the surface of objects which are placed in the working area of the beam by running computer software for controlling the beam steering mirrors. A laser with adequate vitrification power will then vitrify, or change to glass, the surface of clay-containing objects including the colorant carrier falling in the path of the laser beam. The width of the beam, temperature and moisture content of the clay-containing object, gaseous atmosphere at the work surface and speed of beam movement can be optimized to maximize the throughput of a laser marking system. Vitrification of porous non-vitrifiable objects is possible by adding clays to the carrier. The use of a sealed colorant package allows prepackaging colorants to be used eliminating the need for handling various pigments that can stain or are known carcinogenic.

44 Claims, 3 Drawing Sheets

SELECTIVE LASER COMPOUNDING FOR VITRESCENT MARKINGS

FIELD OF INVENTION

This invention relates to the field of marking materials with lasers and more particularly to a method of vitrifying heat sensitive coatings to materials.

BACKGROUND OF THE INVENTION

Bricks can be formed from a variety of clay-based materials and in a variety of colors and sizes. Primary materials include surface clays, fire clays, shales or combinations of these. For proper forming, such materials must have plasticity when sufficiently wetted, rigid when dried. Bricks can be then formed by extrusion, molding or dry-pressing and are fired in a kiln at temperatures between 1800° F. and 2100° F. (980° C. and 1150° C.) These variables in manufacturing produce units with a wide range of colors, textures, sizes and physical properties.

Naturally occurring clays are divided into specific types having particular properties. For example, clay is defined as a natural, mineral aggregate consisting essentially of hydrous aluminum silicate. It is a product of decomposition and alteration of feldspathic rocks and contains a mixture of particles of different sizes and widely differing physical, chemical and mineralogical properties. The non-plastic portion consists of altered and unaltered rock particles of which the most common and abundant substances are quartz, micas, feldspars, iron oxides, and calcium and magnesium carbonates. Organic matter usually is present in greater or lesser amounts, and frequently plays an important role in determining clay properties. The essential constituents of clays are hydrated silicates of aluminum, of which there are several, but the most important and widespread are the kaolinite group. The typical clay minerals—kaolinite, montmorillonite, etc., have microscopic plate-like structures which are chiefly responsible for their plasticity (formability) when wetted with water. The fineness of a clay's grain influences not only its plasticity but also such properties as drying performance, shrinkage, warping, strength and quality of marking achievable by laser energy. Clay's with high aggregate contents, sands and organic matter are prone to poor glassy vitrification by laser energy. Clays occur in three principal forms, all of which have similar chemical compositions but different physical characteristics. Surface clays may be the upthrusts of older deposits or of more recent, sedimentary formation. As the name implies, they are found near the surface of the earth.

Shales are clays that have been subjected to high pressures until they have hardened almost to the form of slate. Fire clays are usually mined at deeper levels than other clays and have refractory qualities. As a rule, they contain fewer impurities than shales or surface clays and have more uniform chemical and physical properties. Surface clays and fire clays differ from shales more in physical structure than in chemical composition. Chemically, all three are compounds of silica and alumina with varying amounts of metallic oxides and other impurities. Although technically metallic oxides are impurities, they act as fluxes, promoting fusion at lower temperatures. Metallic oxides. (particularly those of iron, magnesium and calcium) influence the color of the finished fired product. The brick manufacturer minimizes variations in chemical composition and physical properties by mixing clays from different locations in the pit and from different sources. However, because clay products have a relatively low selling price, it is not economically feasible to refine clays to produce uniform raw materials. Since variations in properties of raw materials must be compensated for by varying manufacturing processes, properties of finished products from different manufacturers will also vary somewhat. The widespread usage of bricks as a building material on highly visible areas such as walkways and building fronts has led artisans to attempt to etch and decorate such materials with letters and/or graphical patterns.

It is known that glass can be formed by melting or fusing materials under extremely high temperatures by a process called vitrification. It is also known that lasers produce intensely focused beams of light at specific wavelengths which results in localized heating of an object which falls in the path of the active beam. Laser light can be produced and amplified by a variety of sources including, for example, Nd:YAG lasers produce laser light at a principal wavelength of 1064 nanometers (nm). Nd:YAG lasers can be operated as a continuous wave (CW) laser or with pulse or frequency modification. In the latter instance, a Q-switch is used to reflect the laser beam back into the lasing chamber to build up more power before the beam is released. The result is a pulsed laser with each pulse being more intense than a continuous wave beam from the same laser unit. Other lasers, such as carbon dioxide ($CO_2$), can be constructed and configured for different wavelengths and power outputs.

Laser marking of bricks, pavers, terra-cotta tiles, and other high clay content materials is known in the art. U.S. Pat. No. 6,064,034 previously issued to the Applicant, the contents of which are incorporated herein by reference, discloses a process for the vitrification of bricks and other vitrescent objects by use of a laser. In particular, a continuous wave beam such as that provided from a ND:Yag or $CO_2$ laser operating in a power range of 50–250 watts with a collimator and lens provides a laser beam intensity in the range of about $1.6\times10^5$–$1.4\times10^6$ watts/cm$^2$ for use in marking of a vitrescent object. The laser beam is steered by a computer to produce lettering and graphical patterns on the vitrescent object. For process efficiency and enhancement of the appearance, the surface of the vitrescent object is heated to a temperature of about 100° F. prior to vitrification, or dried so as to achieve a predetermined moisture content.

U.S. Pat. No. 5,538,764 discloses a method of removing a surface layer from a hydraulically bonded material such as concrete. The disclosure is directed to the use of a laser having a power density between 100 W/cm$^2$ and 800 W/cm$^2$ causing surface layer removal between a depth of 1 mm to about 4 mm.

U.S. Pat. No. 5,554,335 is directed to the marking of ceramics by three distinct laser power conditions. A first laser power condition is carried out in a first finite time period, a second laser power condition is carried out in a second time period, and a third laser power condition is carried out in a third finite time period. This process requires an exceedingly long residence time with a concomitant loss of economic efficiency. Additionally, the quality of marking which results from the practice of this invention does not result in a smooth glassy appearance.

U.S. Pat. Nos. 4,769,310 and 5,030,551 discloses a method for marking ceramic materials, glazes, glass ceramics and other glasses. Ceramic and glass materials have been treated at high temperatures in their formation, and thereby have a glassy surface, or a glaze over their entire surface. Such glassified surfaces are difficult to mark, even with a laser. As a result, the '310 and '551 patents disclose a method of applying a transparent layer of material (e.g. 100 to 10,000 angstroms thick) such as titanium dioxide to the outer surface of the ceramic or glass object, and then irradiating the oxide layer with a pulsed laser beam. The irradiation causes discoloration of the applied oxide layer at the irradiated areas.

Glazed ceramic materials, such as whiteware, often develop regions of cracking due to wear, impacts, thermal stresses and the like. U.S. Pat. No. 5,427,825 discloses a method of repairing such glaze defects by preheating a glaze defect area with radiant energy. The glaze defect area is then treated by applying higher power radiant energy (such as infrared) from a laser to provide localized heating of the glaze material. The surface is further treated with radiant energy at a lower power density so as to limit the rate of cooling of the fusion zone and the immediately surrounding regions. This multi-step process prevents thermal stress cracking during the glaze defect repairing procedure.

U.S. Pat. No. 4,814,575 discloses yet a further method of surface-treating ceramic workpieces using a laser. A $CO_2$ laser directs a beam onto a ceramic workpiece to be treated. A carrier gas injector injects a moderate throughput of spheroidized powder of a ceramic material into the beam. After melting and solidifying, the added layer has microcracks which are smaller than the cracks in the untreated surface. This method is useful in the construction of heat engines.

International Application WO 95/35269 discloses a method for the laser marking of bricks to produce artistic patterns, signs and symbols on the brick's surface. This application fails to recognize those conditions which must be optimized in order to form a smooth, glassy marking on the brick.

U.S. Pat. No. 6,238,847 discloses a method of marking a surface of a substrate by applying a marking material having glass frit precursors to the surface of a substrate, irradiating a portion of the marking material with a laser beam to react the glass frit precursors with each other and to adhere to the irradiated marking material on the surface of the substrate forming a permanent marking thereon, then removing the non-irradiated portion of the marking material from the substrate. The marking material is applied in the form of a paste that may be formed from an inorganic pigment such as that sold by Cerdec which is a hydrous sodium lithium magnesium silicate. The pigment is mixed with water into a paste which is applied to the surface of a material. The problem is that the pigment stains porous substrates. The disclosure is limited to surface bonding of pigments applied to the surface with little or no surface damage. No preheating is necessary and a paper or plastic carrier can be used to hold the material, however, the power must be low to prevent the paper or plastic carrier from catching fire.

U.S. Pat. No. 6,075,223 discloses another marking process that requires the applying of a layer of glass frit material containing an energy absorbing enhancer to a glass substrate. The glass frit is irradiated with a laser beam having a wavelength selected to excite the energy absorbing enhancer forming a bonded and permanent marking layer atop the substrate. As with the previous patent, the glass frit is applied to the substrate surface at a desired thickness by use of hand-painting, mechanically brushing or rolling, pad or screen printing, or flood coating of the surface and then scraping or spinning to achieve the desired thickness. After irradiating, the excess material is removed. However, the pigment stains the substrate limiting use of the glass frit to certain substrates. The disclosure is for surface bonding at low power (1–30 watts) with a disclosed optimum power of 3–5 watts. The result is no surface damage as the material is applied atop of the surface. This eliminates preheating and is performed in a single pass. A paper or plastic carrier can be used to hold the material, however, the power must be low to prevent the carrier from catching fire.

U.S. Pat. No. 6,372,819 discloses a method of marking items with a laser activated coating composition. The composition has a dye and a binder resin which, when applied to a item that is heated with a laser, a polymeric material used in the composition is changed.

U.S. Pat. No. 5,801,356 discloses a method of marking a surface wherein a layer of material is adhesively applied to the surface of an item by heating at a temperature sufficient for inscribing the surface underlying the layer of material.

U.S. Pat. No. 5,673,532 discloses a method of coating a surface by applying tiles having edges to adhere to the surface and a vitrifiable grout is placed between the tiles and surface to allow vitrification of the grouting material to the surface.

U.S. Pat. No. 5,215,864 discloses a method of marking a metal material by use of dyes having an affinity to an oxide formed on the metal surface.

The prior art discloses methods of marking ceramic materials by vitrification and by use of various dyes bonded to the materials. However, the prior art fails to teach or otherwise disclose the use of dyes for use in vitrification where the colorant and products of vitrification are compounded together as a result of laser fusion. Nor does the prior art teach a carrier that eliminates the staining of the surrounding area, thereby eliminating problems with colorants that are inadvertently bonded to the surface of the material.

Accordingly, what is needed in the art is a selective laser compounding method that permits a colorant, such as a glass frit, metal oxide, or mixed metal oxide to be applied at high temperatures wherein the colorant and colorant carrier is vitrified to the material without staining of the surrounding area, or burning of the carrier.

SUMMARY OF THE INVENTION

The present invention provides a laser treatment method and process for coloring the surface of a substrate, effectively forming a new compound within the surface of a brick or similar vitrifiable substrate. The brick is formed from a clay-based material, which has at least a partial content that is vitrescent in nature. The present invention thereby uses a laser to heat specific areas of the surface of the brick to vitrify, or glassify, the material at specific locations including a colorant carrier. In one embodiment, the colorant carrier contains thereon a glass frit material, metal oxide, or mixed metal oxide with the carrier operating as an additional source of metal oxide. A laser beam is made steerable via computer controlled steering mirrors. Programs are then utilized to control the computer which steers the beam in the shape of letters or graphical characters across the face of the brick. The programs are written so that different methods of tracing letters or graphical patterns will optimize the laser beam width and intensity.

The preferred embodiment employs a Nd:Yag laser with a wavelength of 1064 Angstroms and utilizes a continuous wave (CW) beam rated for at least 50 Watts, a 10 inch or larger objective lens, and a beam telescope or collimator. A range of useful yet affordable powers would include 50–150 watt laser units. The collimator or beam expander, such as those available from Rodenstock Precision Optics, Inc., expands the beam in a range of 2×–8× that of the original beam width emanating from the laser. The present inventor has discovered that modification of the standard collimator so as to produce a beam that is 1.6× to 1.9× will unexpectedly improve the resultant intensity thereby resulting in more efficient marking of objects, particularly in a mass production situation. In a most preferred embodiment, a beam expansion factor in the range of 1.6×–1.9× is utilized with a 254 mm lens. The beam width must also be of an appropriate width so as not interfere with various rail components, and so that the beam properly interacts with the steering mirrors. As mentioned above, a Q-switch might be incorporated inside the Nd:Yag laser to cause a delay between laser pulses. This allows the power of the emitted beam to build up to a greater power density between each pulse. In its preferred embodiment, the present invention uses a CW beam because it has been found to produce a smoother marking pattern on the brick surface. It is contemplated that other lasers could also be used, including a $CO_2$ laser which operates at a continuous wavelength of 10,640 Angstroms and a variety of power ranges.

A galvanometer motor is connected to a X-axis rotating mirror and yet another galvanometer motor is connected to a Y-axis rotating mirror. Each mirror is used in conjunction with the other, and with a computer control device, to steer and direct the laser beam in a pattern across the surface of a workpiece. Upon contact of the laser beam with the brick, a portion of the surface vitrifies, or turns to glass. The use of the colorant carrier exemplifies the instant process by allowing the use of bricks that otherwise fail to provide suitable coloration upon vitrification. The glass substance produced via vitrification can vary in color depending upon the color and type of brick used as well as the glass colorant. For instance, a reddish brick is found to produce a darker or black vitrification. Lighter shades of bricks, including for instance grey and ivory, have been shown to produce more of a greenish vitrification. In each case, the vitrified patterns are easily visible on the surface of the brick. The vitrification area and its appearance might also be varied by changing the laser type, laser configuration, and laser power, along with the brick type.

As the marking is vitrified and the glassification occurs at or below the substrate of the surface, the glassified surface area, inclusive of the colorant, is integrally formed into the surrounding material of the brick and cannot be readily worn off. While the lettering or graphical patterns are very visible, little to no channeling occurs in the brick surface to produce such patterns, and the pattern colors are a natural result of the glassification process. The vitrification process is more resistant to freezing or abrasion. For instance, paint or dye applied to the surface of a brick quickly wears off. Sand blasting requires generation of a mask and results in channels which must be painted in order to be readily seen. Such channels quickly fill up with such things as debris, dirt, rain, and/or snow, particularly when the bricks are laid flat and used on a walkway. Such channels can also be worn and "islands" of material can be chipped away. Accordingly, the lettering or patterns become hard to read and the bricks must be frequently cleaned in order to maintain their original appearance and/or artistic purpose. The vitrification employed by the present invention, thereby creates a localized alteration, or glassification, of the material of the object to be treated. The color and clarity of the laser marking will vary depending on the softness and/or overall clay-content of the object to be treated. Clay is the base material which is altered by the heat of the laser to form glass. As a result, terra cotta, which is very soft and has a high clay-content, marks very well with a 50 Watt Nd:Yag laser. Other objects such as clay pots and pavers experience similar results as dependant upon similar factors. Alternatively, porous materials such as cement that have no clay content can be vitrified by use of clays in the mix wherein glassification occurs on the material although the clays and colorant carrier are required for the marking process.

It is therefore an objective of the present invention to provide an improved laser marking method for the localized vitrification of vitrescent objects.

It is a still further objective of the present invention to provide for the fast and efficient throughput of objects to be marked with the laser marking system even if the objects lack sufficient vitrescent properties.

It is yet another objective of the present invention to provide for programmable lettering or graphical symbols to be vitrified into the surface of vitrescent objects, such as bricks.

Another objective of the present invention to provide for programmable lettering or graphical symbols to be vitrified into the surface of non-vitrescent objects, such as cement.

It is a further object of the present invention to provide a laser marking method and process for the localized vitrification of vitrescent objects without the need for cleaning of colorants or glass frit from the object upon marking completion.

It is yet still another objective of the instant invention to provide a carrier that forms an integral portion of the composition for use in the vitrification process.

It is yet still another objective of the instant invention to provide nickle, brass, aluminum and the like metals capable of being placed into a foil that, upon absorption of laser energy, form reactive oxides or alterative compounds.

It is still another objective of the instant invention to teach the use of a sealed colorant package that allows prepackaging colorants to be used thereby eliminating the need for handling various pigments that can stain or are known carcinogens.

It is yet still another objective of the instant invention to provide enhanced laser marking of vitrescent objects, namely bricks, by utilizing optimal moisture content and surface temperature of the vitrescent object.

It is yet still another objective of the instant invention to provide enhanced laser marking of objects without staining of the surrounding area.

It is yet still another objective of the instant invention to provide enhanced laser marking of vitrescent objects at high temperatures without burning of the carrier.

Still another objective of the instant invention is to provide a prepackaged composition for vitrified marking of objects wherein unused composition is sealed with the package.

Other objectives and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE PREFERRED EMBODIMENT

Although the invention will be described in terms of a specific embodiment, it will be readily apparent to those skilled in this art that various modifications, rearrangements and substitutions can be made without departing from the spirit of the invention. The scope of the invention is defined by the claims appended hereto.

Figure 1:
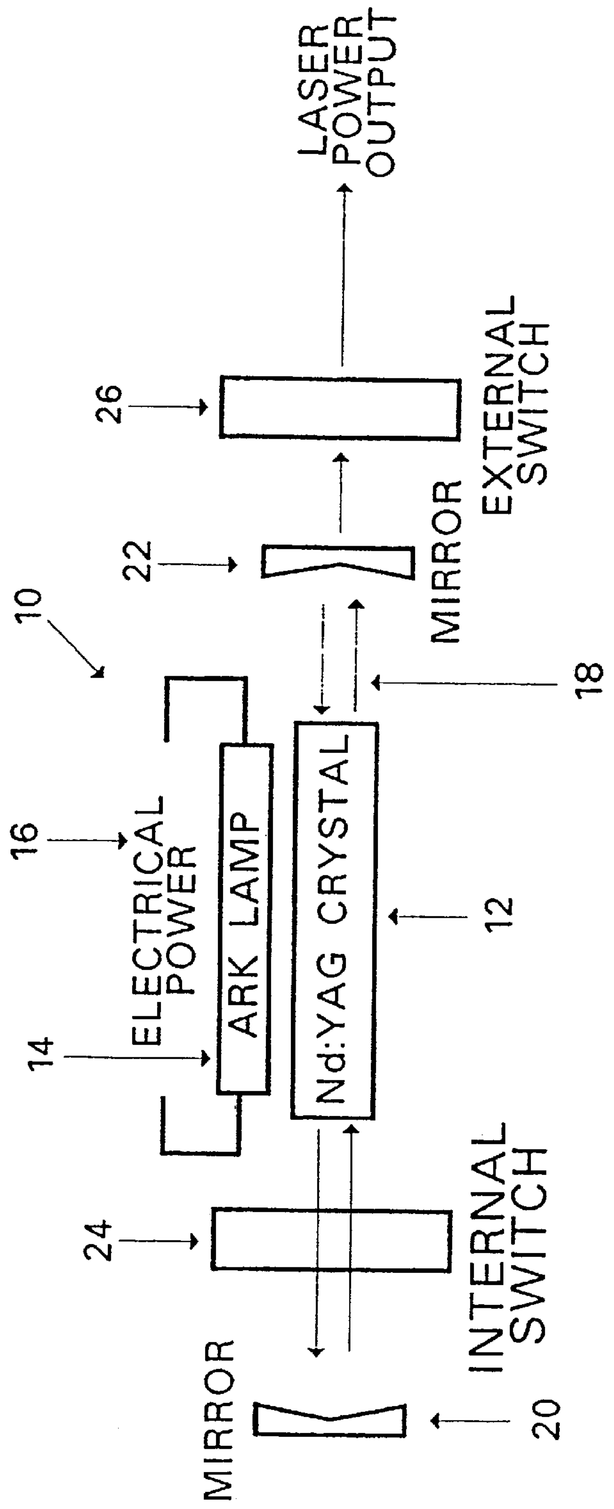
FIG. 1 shows a block diagram of the basic operation of an Nd:Yag laser configuration.

Referring now to FIG. 1, a block diagram of a typical Nd:Yag laser configuration 10 is shown. An Nd:Yag crystal 12 is excited by a krypton arc lamp source 14 which is powered by an electrical source 16. The crystal 12 produces a laser beam 18 which is reflected back and forth through the crystal 12 by a first mirror 20 and second mirror 22. When the beam is powerful enough, it will pass through the second mirror 22 and will be a continuous wave beam. An internal switch 24, or Q-switch, can be used to further reflect the beam 18 back through the crystal 12 until it builds up even more power. This produces a pulsed, or discontinuous beam, with each pulse having relatively more power than a continuous beam. An external switch 26 allows the beam, pulsed or continuous, to exit the laser for application to the work surface. In the present invention, a continuous wave beam has been found to have sufficient power to quickly mark the surface of the vitrescent object. The continuous wave beam is also preferable because it produces a smoother mark due to its non-pulsing action upon the surface of the vitrescent object.

Figure 2:
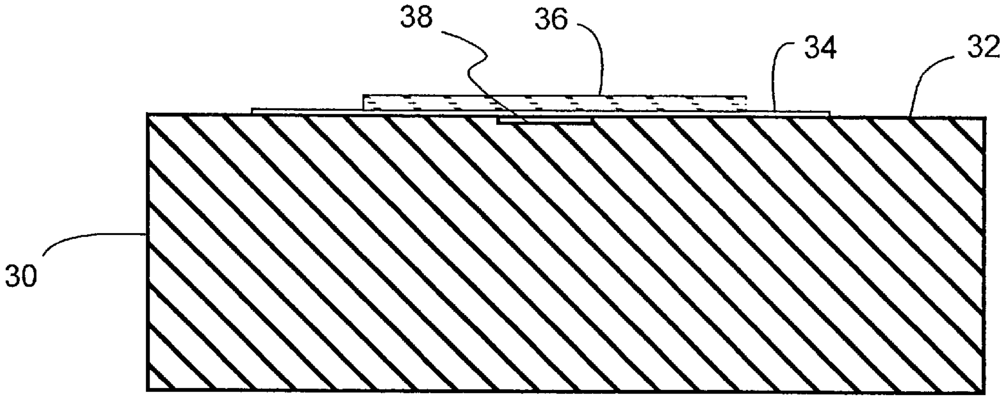
FIG. 2 is cross sectional view of the colorant carrier in an open faced package.

FIG. 2 is a cross sectional side view depicting a brick 30 having a substrate surface 32. The colorant carrier 34 is positioned over the surface 32 of the brick 30 with the glass frit precursors placed on top of the foil 34. The colorant carrier holding the glass frit precursors during the irradiation step, the foil forming the metal oxide used in the vitrification composition.

Figure 2A:
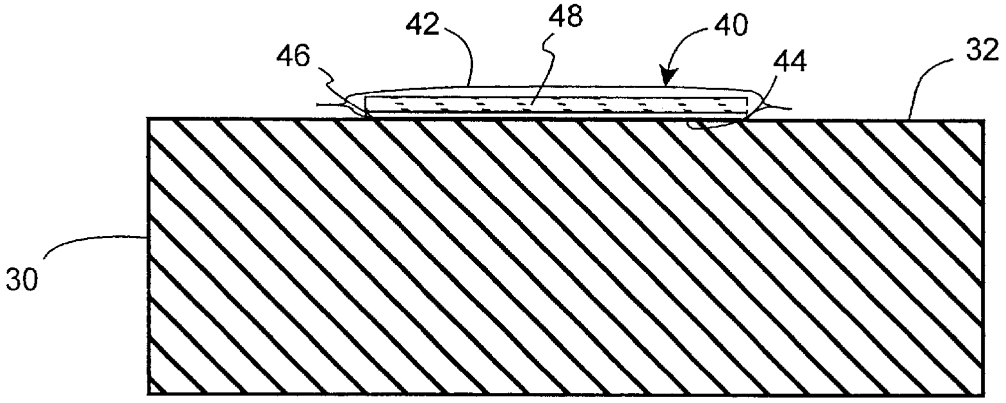
FIG. 2A is cross sectional view of the colorant carrier in a sealed package.

FIG. 2A is a cross sectional side view depicting a brick 30 having a substrate surface 32 wherein the colorant carrier 40 is a sealed package having a top 42, bottom 44, and a peripheral sealed edge 46. The colorant, for example, glass frit precursors 48 are distributed within the sealed package, either homogeneously or in a predetermined distribution pattern, allowing prepackaged shipment of the colorant carrier. In this embodiment, the colorant may be admixed with a liquid, such as mineral oil to form a paste or slurry. Colorant placed on a porous object, in a paste or slurry, typically results in a staining of the surrounding area requiring a labor intensive scrubbing of the vitrified object. Failure to remove the colorant from the surrounding area can lead to an unsightly discoloration. Further, even if the colorant is believed to be removed, trace amounts can discolor over time due to UV exposure or normal aging. In a preferred embodiment, the top and bottom sheet is made from foil wherein the colorant composition is sealed within the package. During the laser marking process, only the area that is used in the vitrification step is removed and the laser beam is adjusted so that the package is resealed during the step. Thus, if a dry powder colorant composition is employed, exposure to such items as crystalline silica, which is a known carcinogenic, is reduced or eliminated.

Figure 3:
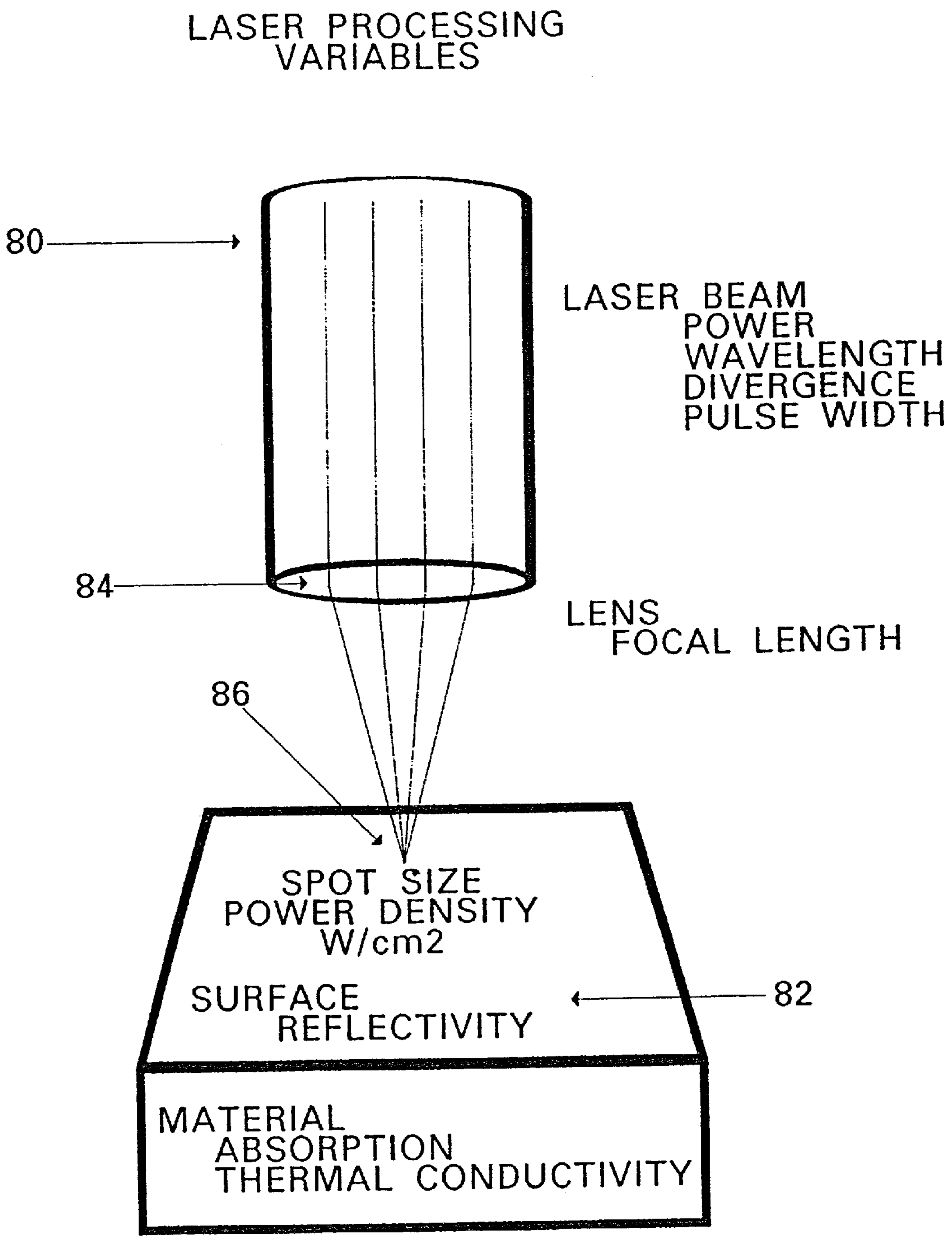
FIG. 3 shows a perspective view of laser beam affecting a surface with various laser processing variables detailed.

Referring now to FIG. 3, a perspective view of a laser beam 80 is shown affecting an object surface 82, such as a brick, with various laser processing variables detailed. The laser beam 80 is generally affected by the following parameters: laser power, wavelength of the beam, divergence of the beam, and pulse width. The beam 80 passes through a lens 84 which focuses the beam at a certain distance depending upon the focal length of the lens. The beam is focused down to a spot size 80, which may be in the range of about 0.006"–0.009" (0.15–0.22 mm) diameter, but is not limited thereto. When using lasers in a useful range of about 50–250 watts, a power density or laser beam intensity in the range of about $1.6\times10^5$–$1.4\times10^6$ watts/cm$^2$ results. The affect the beam will have upon the surface of the object 82 will depend upon the reflectivity of the surface and the type of material making up the object.

Accordingly, different settings of the parts and parameters affecting the beam will similarly affect the beam's vitrification of a brick surface. An aperture is generally included to narrow the beam. In the instant invention it has been found that an optimum beam can be achieved by using no aperture, e.g. utilizing the full beam width, and modifying the collimator, which normally functions to expand the beam within a range of 2×–8×, to produce an atypical beam expansion on the order of about 1.6×to 1.9× the generated beam width. This setting produces a relatively wide beam, but also produces a beam with a sufficient power density or laser beam intensity to vitrify bricks and other clay-based objects. By achieving the widest possible beam width with vitrifying power, the laser can vitrify a wider path with each pass over an object surface. The resultant increase in operating efficiency translates into a speed up of production and ultimately a reduction in costs for the laser marking business. While the above stated ranges of collimator, power density, aperture settings, and lens size define a particular embodiment, it is within the purview of this invention to use alternative groups of settings which serve an equivalent function.

The material parameters affecting the process of vitrification include material absorption and thermal conductivity, as well as the aforementioned clay content of the object. A typical brick suited for vitrification includes a varied mixture of clay, sand, and grog. Grog is broken up pieces of brick that are placed back into the mix to manufacture new bricks. The general contents of a brick will vary in percentage per brick lots and brick colors. No specific brick from any particular manufacturer has been found to be more preferable over any other; the different bricks are susceptible to vitrification in varying degrees depending upon such things as the clay, sand, and grog content, and the overall color.

The colorant used in the vitrification can be a glass frit and a dye. Glass frit is generally composed of alkali metal oxides, alkaline earth metal oxides, silica, boric oxide and transition metal oxides. A stain may include silver sulfide, copper, copper oxide, barium sulfate, iron sulfide, calcium hydroxide and crystalline silica. Another stain may contain silver sulfide, copper oxide, copper-iron sulfide and kaolin clay. Still another stain may contain copper, copper oxide, silver sulfide, barium sulfate, iron sulfate, iron oxide, and crystalline silica. Black stains may contain lead borosilicate cobalt compounds, iron oxide chromium compounds, nickel, manganese and chromium compounds and iron oxides.

Additional marking enhancement agents include, but are not limited to, porcelain enamel mixtures. These mixtures may include oxides of chromium, cobalt, aluminum and manganese, fluoride containing compounds, soluble molybdenum compounds, crystalline silica, copper, nickel and zirconium compounds; spinels, for example. Cobalt Chromite Blue-Green Spinel ($Co(Al,Cr)_2O_4$), Chrome Iron Nickel Black Spinel ($(Ni,Fe)(Cr,Fe)_2O_4$:MnO); and pigments such as Nickel antimony Titanium Yellow Rutile ($(Ti,Ni,Sb)O_2$.

A carrier is formed from a clean metal based foil wherein pigment colorants can be added to react with the metal oxide formed during the vitrification. The metal oxide, pigment and glass frit permanently alter the surface of the object. The glass frit provides a smooth shiny surface. The pigment, metal oxide, and brick material irreparably damage the surface wherein the object must allow for some vitrification. However, unlike the prior art, the object need not have a material content that allows for glassification of an image during vitrification. Rather, the object need only have sufficient material, content to allow for partial vitrification wherein the vitrified portion remain at or below the surface of the object.

Nickle, brass, aluminum and the like metals capable of being placed into a foil are acceptable carriers. Such carriers, upon absorption of laser energy, form reactive oxides or alterative compounds. Preferably, an aluminum foil is employed such as that manufactured by ALL-FOILS, INC., having a gauge between 0.00025 inches to 0.0059 inches.

Suitable inorganic pigments which might be used are zirconium silicate, zirconium oxide or tin oxide, the crystal lattice of which contains ions of transition metals or rare earth metals, as e.g., in zirconium vanadium blue, in zirconium preseodyme yellow and in zirconium iron pink, or the cadmium sulfides and cadmium sulfoselenides as well as inclusion pigments containing such compounds, e.g., based on zirconium silicate, tin oxide, zirconium oxide or quartz.

Preferred pigments are zirconium vanadium yellow, preseodyme yellow, the iron oxide brown pigments such as zinc-iron-chrome spinels and zirconium iron pink, titanium dioxide, titanates, cadmium sulfides and cadmium sulfoselenides as well as inclusion pigments containing such compounds.

Typical ceramic colorants are cobalt aluminates, chrome tin pink sphere, chrome tin orchid cassitorite, zirconium preseodyme yellow, zirconium iron pink, tin vanadium yellow, cadmium sulfoselenides and cadmium sulfides and the inclusion compounds containing them such as zirconium silicate, tin oxide, zirconium oxide or quartz; copper-red, manganese pink, colcothar, the iron oxide brown pigments such as iron oxides, iron-chrome-alumina spinels, manganese-alumina spinels, wine-chrome spinels, iron-alumina spinels, zinc-iron spinels, nickel-iron spinels, manganese-chrome spinels, zinc-iron-chrome spinels, tin oxide, titanium dioxide and titanates, such as nickel-antimony titanate, chrome-antimony titanate or manganese-antimony titanate.

It is important, in order to achieve successful marking, to utilize vitrescent objects which have a reduced water content. The absorption characteristics of a brick may be determined in the following manner. Absorption is defined as the weight of water a brick unit absorbs, when immersed in either cold or boiling water for a stated length of time. This is expressed as a percentage of the weight of the dry unit. See ASTM Specification C 67. Absorption characteristics can be broken down into two distinct categories—total absorption and initial rate of absorption (IRA). Both are important in selecting the appropriate brick. Total absorption of a brick is expressed as a percentage, and defined as the ratio of the weight of water that is taken up into its body divided by the dry weight of the unit. Water absorption is measured in two ways: 1) submerging the test specimen in room temperature water for a period of 24 hours, and 2) submerging the test specimen in boiling water for five hours. These are known as the 24 hour cold water absorption, and the 5 hour boiling water absorption, respectively. These two are used to calculate the saturation coefficient by dividing the 24 hour cold water absorption by the 5 hour boiling. The saturation coefficient is used to help predict durability.

In order to successfully and efficiently mark vitrescent objects, such as bricks, our tests have shown that the vitrescent object must be almost completely dry in order for the laser energy to completely melt and fuse the clay into homogeneous glass. When moisture is present, the laser energy for melting is lost converting water to steam. As the steam escapes through the molten glass, it causes bubbles to form. Moisture also sinks heat away from the surface causing poor penetration of the beam and resulting in very poor marking qualities.

The average moisture content of a high quality clay brick paver as received from commercial sources is approximately 2 to 8 percent by weight. Moisture can be acquired from rain, snow, condensation, factory applied water based sealants, etc. Moisture content must be reduced to about 0.75 percent or less to achieve optimum laser vitrification. Drying will also optimize the glass formation so as to produce a very smooth and glassy appearance of the marked area. This drying can be accomplished with post-drying by a kiln, oven or infra-red heat sources. When dry, most of the laser energy will be able to be used to vitrify the clay surface to glass and the remainder into heating the clay body. The best option and the one that produces optimum results, is to have a relatively dry and warm (100° F. or more) surface when attempting laser vitrification of a clay body. A cold clay body, e.g. room temp. or colder, acts as a heatsink, drawing the heat of the laser energy away from the marking area, and in turn heating the clay body. Pre-heating maximizes the amount of laser energy which can be utilized for localized melting rather than first warming the clay surface and then melting. This pre-warming can be accomplished with a batch warming oven or an infra-red heat source, by use of the laser beam, or by heating of the foil before the vitrification step.

In a particularly preferred embodiment of the invention, an oxygen gas assist is incorporated in the process in order to create an oxygen enriched atmosphere at the work surface. This may be accomplished by incorporating a gas supply manifold, (not shown) or any equivalent means of supplying oxygen to the work surface during laser vitrification. The inclusion of oxygen yields improvements in both marking quality and efficiency of the process, per se. While not wishing to be bound to any particular theories, it appears that the inclusion of oxygen increases the apparent beam intensity at the interface of the focal point of the laser beam and the clay body surface. This apparent increase in intensity provides more depth, width and visual appeal to the finished vitrified surface. These benefits are achieved with no penalty in marking speed, and in some cases, an increase in speed is possible. The oxygen can be introduced via flexible hoses and diffuser, which floods the surface of the clay body with a continuous stream or a custom fabricated delivery apparatus, such as a manifold for applying a constant laminar flow of oxygen across the work surface, can be made. Heating the gas, prior to delivery at the work surface, has also been shown to result in improved performance and efficiency.

All patents and publications mentioned in this specification are indicative of the levels of those skilled in the art to which the invention pertains. All patents and publications are herein incorporated by reference to the same extent as if each individual publication was specifically and individually indicated to be incorporated by reference.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

What is claimed is:

1. A method for selective laser compounding of an object comprising the steps of:

providing a carrier effective for positioning at least one colorant adjacent to, but not in contact with, an object to be marked;

positioning said colorant in juxtaposed relation with a surface of said object to be marked;

providing a means for producing a continuous wave laser beam operating in a power range of about 50–250 watts, said means including a collimator and a lens;

setting of said collimator and lens to produce a laser beam;

configuring said laser beam to form lettering and graphical patterns of a desired image upon said carrier;

steering said laser beam over said carrier to trace said desired image; and vitrifying a localized portion of said carrier and underlying surface in accordance with said desired image;

wherein said surface of said object is altered to form a permanent mark including at least one colorant according to said desired image.

2. The method of marking according to claim 1 wherein said colorant is placed on a foil carrier.

3. The method of marking according to claim 2 wherein said colorant is selected from the group consisting of aluminum, chromium, cobalt, manganese, fluoride containing compounds, soluble molybdenum compounds, crystalline silica, copper, nickel, zirconium compounds, and spinels.

4. The method of marking according to claim 1 wherein a surface of said carrier is coated with at least one colorant selected from the group consisting of metal oxide, mixed metal oxide, glass frit precursors, glass beads or a combination thereof.

5. The method of marking according to claim 1 wherein said colorant includes a pigment.

6. The method of marking according to claim 1 wherein said carrier includes clays.

7. The method of marking according to claim 1 wherein said steering means moves said laser beam at about 50 mm/sec.

8. The method of marking according to claim 1 wherein said laser beam is a Nd:Yag laser.

9. The method of marking according to claim 1 wherein said laser beam is a continuous wave carbon dioxide laser.

10. The method of marking according to claim 1 including the step of moisture removal from the object by preheating the object in an oven.

11. The method of marking according to claim 10 wherein said moisture removal is performed by preheating the object with said laser.

12. The method of marking according to claim 3 wherein said foil is aluminum having a gauge of between about 0.00025 inches to 0.0059 inches.

13. The method of marking according to claim 1 wherein said laser beam has a beam expansion of about 1.6×–1.9×.

14. A method for selective laser compounding comprising the steps of:

reducing the moisture content of an object to be marked;

positioning a sheet like colorant carrier above the surface of said object to be marked, said colorant carrier containing a predetermined amount of at least one colorant, said colorant carrier having at least one surface coated with a metal oxide;

irradiating the carrier with a radiant energy beam having a wavelength selected to vitrify the carrier and colorant to said object, thereby forming a bonded and permanent marking layer even with, or beneath the substrate surface of the object.

15. The method of marking according to claim 14 wherein said colorant carrier is further defined as a carrier coated with at least one colorant selected from the group consisting of a metal oxide, mixed metal oxide, glass frit precursors, glass beads or a combination thereof.

16. The method of marking according to claim 14 wherein said colorant is selected from the group consisting of aluminum, chromium, cobalt, manganese, fluoride containing compounds, soluble molybdenum compounds, crystalline silica, copper, nickel, zirconium compounds, and spinels.

17. The method of marking according to claim 14 wherein said colorant includes a pigment.

18. The method of marking according to claim 14 including a steering means for moving said irradiating source at about 50 mm/sec.

19. The method of marking according to claim 14 wherein said irradiating is from a Nd:Yag laser.

20. The method of marking according to claim 14 wherein said irradiating is from a continuous wave carbon dioxide laser.

21. The method of marking according to claim 14 including the step of moisture removal from the object by preheating the object in an oven.

22. The method of marking according to claim 14 wherein said moisture removal is performed by preheating the object with said laser.

23. The method of marking according to claim 14 wherein said foil has a gauge between about 0.00025 inches to 0.0059 inches.

24. The method of marking according to claim 14 wherein said foil is open faced with said at least one colorant placed on a surface of said foil, wherein said colorant is placed adjacent to, but not in contact with said object to be marked.

25. The method of marking according to claim 14 wherein said foil forms a sealed package with said at least one colorant distributed within said package, wherein said colorant is placed adjacent to, but not in contact with said object.

26. The method of marking according to claim 25 wherein unused colorant is sealed within said package.

27. The method of marking according to claim 14 wherein said irradiating is from a laser beam having an energy level ranging between about 50–250 watts coupled to a collimator and a lens.

28. The method of marking according to claim 14 wherein said collimator and lens to produce a beam expansion of about 1.6×–1.9×.

29. A method for selective laser compounding for vitrescent markings comprising the steps of:

positioning a metal toil sheet like colorant carrier above the surface of said object to be marked;

said colorant carrier including at least one colorant selected from the group consisting of metal oxides, mixed metal oxides, glass frit precursors, glass beads or a combination thereof;

irradiating said colorant carrier with a radiant energy beam having a wavelength selected to vitrify the carrier and colorant to said object, thereby forming a bonded and permanent marking layer even with, or beneath the substrate surface of the object.

30. The method of marking according to claim 29 wherein said metal foil is aluminum.

31. The method of marking according to claim 29 wherein said metal foil is nickel.

32. The method of marking according to claim 29 wherein said metal foil is copper.

33. The method of marking according to claim 29 wherein said colorant includes a pigment.

34. The method of marking according to claim 29 including a steering means for moving said irradiating source at about 50 mm/sec.

35. The method of marking according to claim 29 wherein said irradiating is from a Nd:Yag laser.

36. The method of marking according to claim 29 wherein said irradiating is from a continuous wave carbon dioxide laser.

37. The method of marking according to claim 31, 32 or 33 wherein said foil has a gauge between about 0.00025 inches to 0.0059 inches.

38. The method of marking according to claim 29 wherein said foil is open faced with said at least one colorant placed on a surface of said foil, wherein said colorant is placed adjacent to, but not in contact with said object.

39. The method of marking according to claim 29 wherein said foil forms a sealed metal foil package with said colorant placed within said package, wherein said colorant is placed adjacent to, but not in contact with said object.

40. The method of marking according to claim 39 wherein unused colorant is sealed within said package.

41. The method of marking according to claim 39 wherein a portion of said sealed package is non-metallic.

42. The method of marking according to claim 39 wherein said irradiating is from a laser beam having an energy level ranging between about 50–250 watts coupled to a collimator and a lens.

43. The method of marking according to claim 29 wherein said at least one colorant is admixed with at least one clay for vitrification on non-vitrifiable objects.

44. The method of marking according to claim 29 wherein said non-vitrifiable objects are porous.

* * * * *